US009755354B1

(12) United States Patent
Aumiller

(10) Patent No.: US 9,755,354 B1
(45) Date of Patent: Sep. 5, 2017

(54) CORD MANAGEMENT DEVICE

(71) Applicant: Brian M. Aumiller, Clearwater, FL (US)

(72) Inventor: Brian M. Aumiller, Clearwater, FL (US)

( * ) Notice: Subject to any disclaimer, the term of this patent is extended or adjusted under 35 U.S.C. 154(b) by 0 days.

(21) Appl. No.: 15/464,414

(22) Filed: Mar. 21, 2017

(51) Int. Cl.
*H01R 13/60* (2006.01)
*H02G 3/04* (2006.01)
*F16B 47/00* (2006.01)

(52) U.S. Cl.
CPC .......... *H01R 13/60* (2013.01); *F16B 47/003* (2013.01); *H02G 3/0456* (2013.01)

(58) Field of Classification Search
CPC .... B65H 2701/34; B65H 75/28; H01R 13/60; H01R 13/6392
See application file for complete search history.

(56) References Cited

U.S. PATENT DOCUMENTS 3,113,996 A * 12/1963 Sanford ................ H01R 13/60 174/67
3,626,495 A * 12/1971 Bastian, Jr. ............ B65H 75/06 242/405.2
4,123,012 A * 10/1978 Hough .................. B65H 75/06 242/405.2
4,177,961 A * 12/1979 Gruenewald .......... B65H 75/36 242/405.2
4,183,603 A * 1/1980 Donarummo ...... H01R 13/6392 439/369
4,577,809 A * 3/1986 Auer ..................... B65H 59/22 191/12.2 R
5,348,240 A * 9/1994 Carmo .................. B65H 75/28 242/401
5,458,241 A * 10/1995 Brown .................. B65H 75/06 206/419
6,142,405 A * 11/2000 Black .................... B65H 75/06 242/388.6
6,270,370 B1 * 8/2001 Chien ................... H01R 13/60 439/371
6,286,777 B1 * 9/2001 Black .................... B65H 75/06 242/388.6
D449,580 S * 10/2001 Gee, II ...................... D13/139.8
6,402,547 B1 * 6/2002 DeGutis ............ H01R 13/6392 439/501
6,503,097 B2 * 1/2003 Archambault ......... H01R 13/60 439/4
6,698,560 B2 * 3/2004 Reardon ............... H01R 13/72 191/12 R
7,455,258 B2 * 11/2008 Proebstle .............. B65H 75/06 242/400.1
D596,013 S * 7/2009 Simmons ....................... D8/356
(Continued)

*Primary Examiner* — Bradley Duckworth
(74) *Attorney, Agent, or Firm* — Nicholas Pfeifer; Smith & Hopen, P.A.

(57) ABSTRACT

A cord management device securable to objects lacking a cord management system. An embodiment includes a flexible substratum on which two outwardly facing hooks are secured in a longitudinally spaced manner. An embodiment further includes a receptacle adapted to receiving and temporarily house the prongs on an electrical cord. The flexible substratum preferably includes an adhesive, magnet or fastener to temporarily or permanently secure the device to objects. The device is thereby attachable to an object to aid in the securement of an electrical cord.

10 Claims, 6 Drawing Sheets

(56) References Cited

U.S. PATENT DOCUMENTS

| | | | | |
|---|---|---|---|---|
| 7,610,661 | B2 * | 11/2009 | Sween | B65H 75/06 24/129 R |
| 8,523,098 | B2 * | 9/2013 | Detweiler | B65H 75/28 242/400.1 |
| 2011/0220754 | A1 * | 9/2011 | Merten | B65H 75/4476 242/400.1 |
| 2011/0230085 | A1 * | 9/2011 | Castagnola | B60D 1/62 439/528 |
| 2012/0206100 | A1 * | 8/2012 | Brown | B60L 3/0069 320/109 |
| 2013/0001376 | A1 * | 1/2013 | Asta | A47L 9/0063 248/89 |
| 2013/0193253 | A1 * | 8/2013 | Sarver | B65H 75/06 242/400.1 |
| 2016/0152437 | A1 * | 6/2016 | Stanton | B65H 75/406 242/578.2 |
| 2016/0355374 | A1 * | 12/2016 | Sinnett | F16L 3/1075 |

* cited by examiner

CORD MANAGEMENT DEVICE

BACKGROUND OF THE INVENTION

1. Field of the Invention

This invention relates, generally, to the management of cords. More specifically, it relates to the management of electrical cords connected to devices not equipped with a means for organizing and storing the electrical cords connected to said devices.

2. Brief Description of the Prior Art

There are many electronic devices that require electrical cords and yet fail to include a means for organizing and storing their respective electrical cords when the devices are not in use. These cords can become tangled or are left in a messy heap, which can be a tripping hazard. Some attempt to wrap the electrical cord around the object itself, but the cord rarely remains securely wrapped.

Accordingly, what is needed is a versatile cord management device that can be attached to nearly any object and provides a structure for securely restraining an electrical cord and the cord's plug. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an aftermarket cord management device is now met by a new, useful, and nonobvious invention.

The novel structure includes a pair of outwardly facing hooks disposed in a longitudinally spaced configuration. The hooks are preferable attached to a top surface of a flexible substratum. The bottom surface of the substratum includes adhesive, magnet(s), or fastener(s), thereby allowing the device to be secured to an object in need of a cord management device.

An embodiment includes a receptacle secured between the pair of outwardly facing hooks. The receptacle has two or more apertures adapted to receive prongs extending from the plug end of an electrical cord. In an embodiment, the receptacle is offset from the midline between the two hooks, such that a surface opposite of the surface containing the two or more apertures is closer to the nearest hook than the surface having the apertures.

An embodiment includes a catch and a receptacle. The catch has a bottom surface with an adhesive, fastener, or magnet for attaching the catch to an object. The receptacle has a side containing two or more apertures adapted to receive prongs extending from a plug end of an electrical cord, and a bottom surface with an adhesive, fastener, or magnet for attaching the receptacle to an object. The catch is preferably secured to an object in an orientation where the catch is facing the side of the receptacle having the two or more apertures.

An embodiment includes a flexible substratum on which the catch and receptacle are secured. The substratum in turn has a bottom surface with an adhesive, fastener, or magnet, thereby allowing the device to be secured to an object in need of a cord management device.

In an embodiment, the receptacle and the catch are manufactured as a single unit and adapted to separate into two components prior to use, using for example a perforated seam.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

Figure 1A:
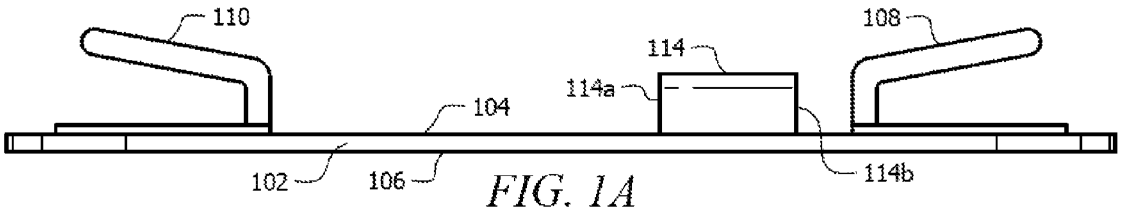
FIG. 1A is a side view of an embodiment of the present invention.
Figure 1B:
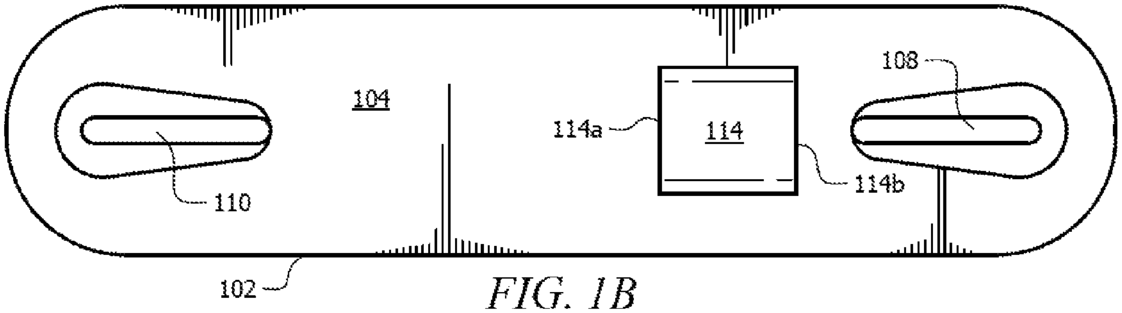
FIG. 1B is a top view of an embodiment of the present invention.
Figure 2:
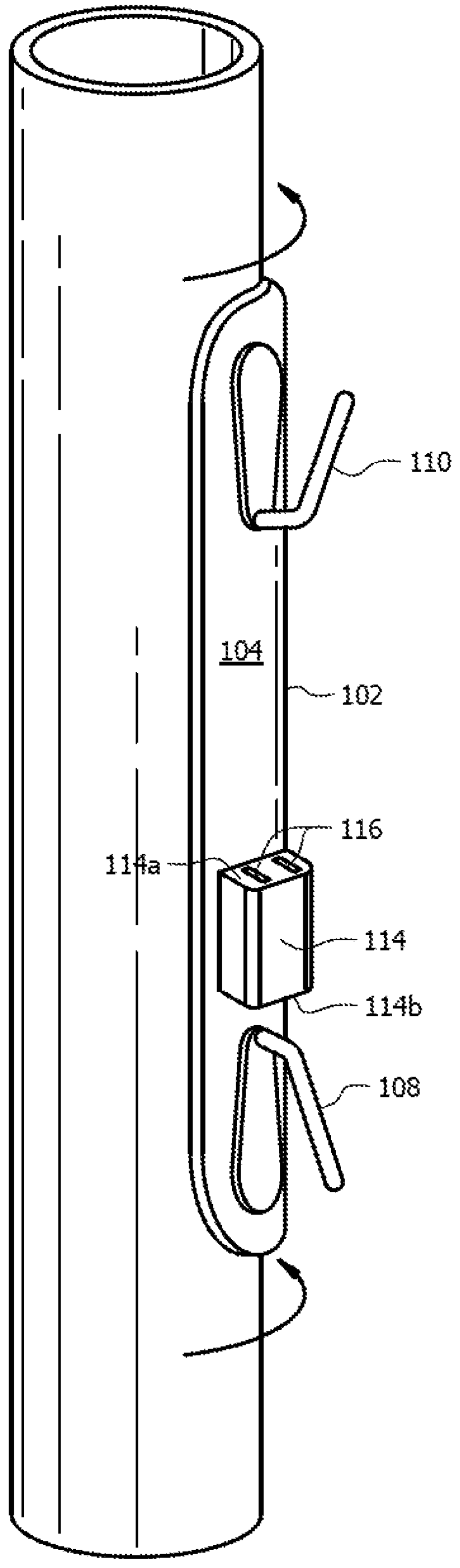
FIG. 2 is a perspective view of the present invention secured to a cylindrical object, highlighting the flexibility of the present invention.
Figure 3:
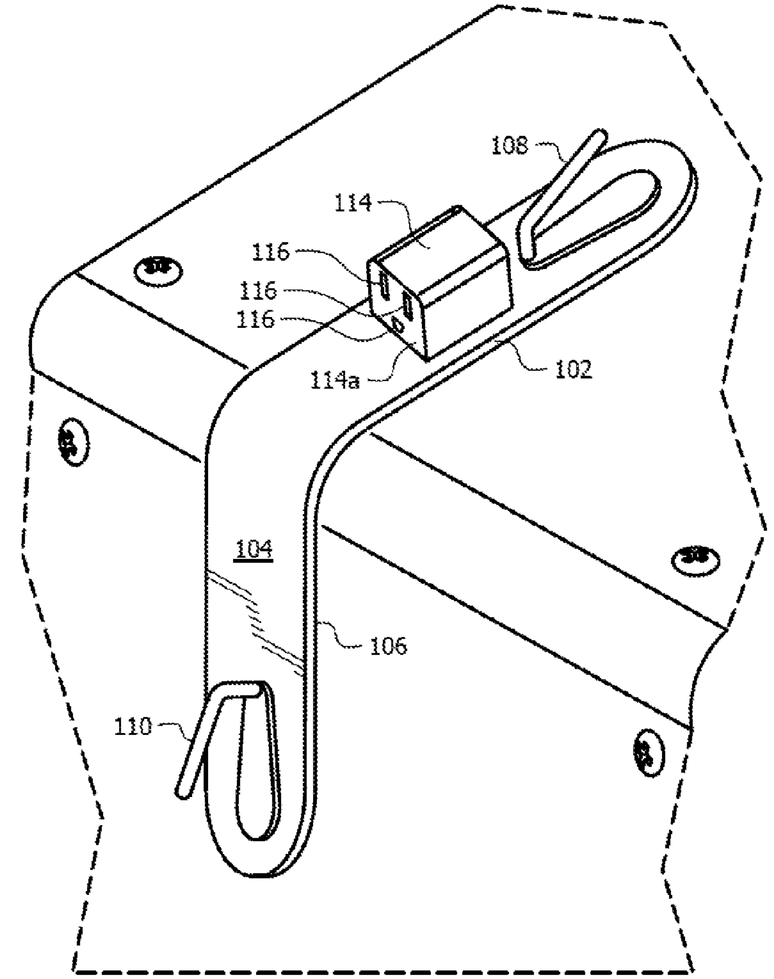
FIG. 3 is a perspective view of the substratum wrapping around a curved corner of an object to highlight the flexibility of the present invention.

The present invention is a novel apparatus attachable to any device for securing an electrical cord and plug. As depicted in FIG. 1, an embodiment of the present invention includes substratum 102 having top surface 104 and bottom surface 106. Substratum 102 is preferably flexible to conform to the surface over which the substratum is laid. As depicted in FIGS. 2 and 3, the flexibility of substratum 102 allows the apparatus to easily conform to cylindrical objects and rounded edges.

Bottom surface 106 includes an adhesive, fastener, one or more magnets, or another securing instrument known to a person of ordinary skill in the art (not shown) to ensure that substratum 102 can be secured to an object. Bottom surface 106 may use a fastener that provides temporary or permanent affixation to the object on which substratum 102 is secured.

Figure 4:
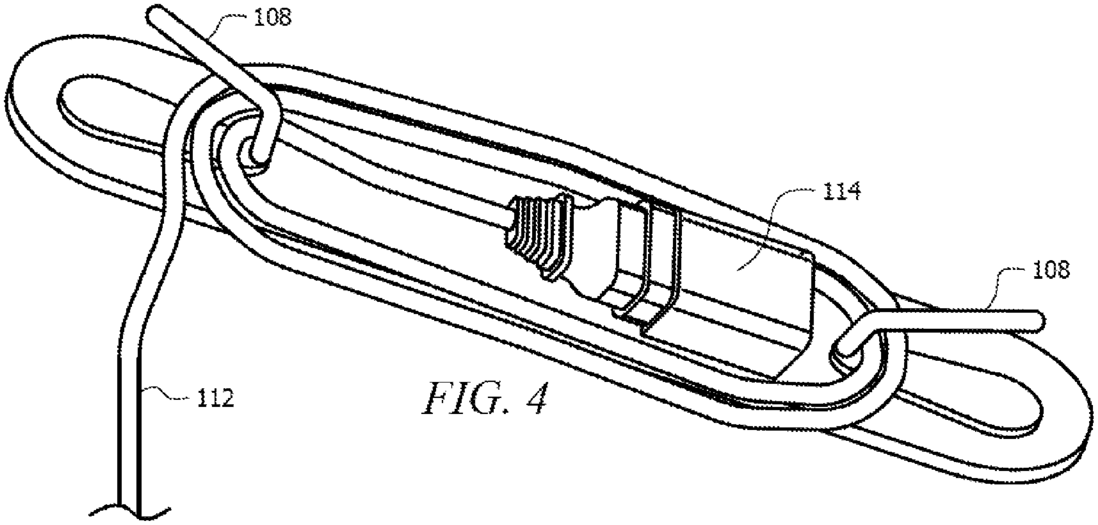
FIG. 4 is a perspective view of an embodiment of the invention with a cord coiled around the longitudinally spaced hooks.

Top surface 104 includes first hook member 108 proximate to a first end of substratum 102 and second hook member 110 proximate to a second end of substratum 102. Hooks 108, 110 are preferably curved or angular structural members directed away from each other. In an embodiment, first hook member 108 and second hook member 110 are arranged in opposing configuration such that the hooks are convexly oriented from the perspective of the midpoint of the substratum. Hooks 108, 110 in combination provide a structure about which cord 112 can be coiled as depicted in FIG. 4.

Figure 5A:
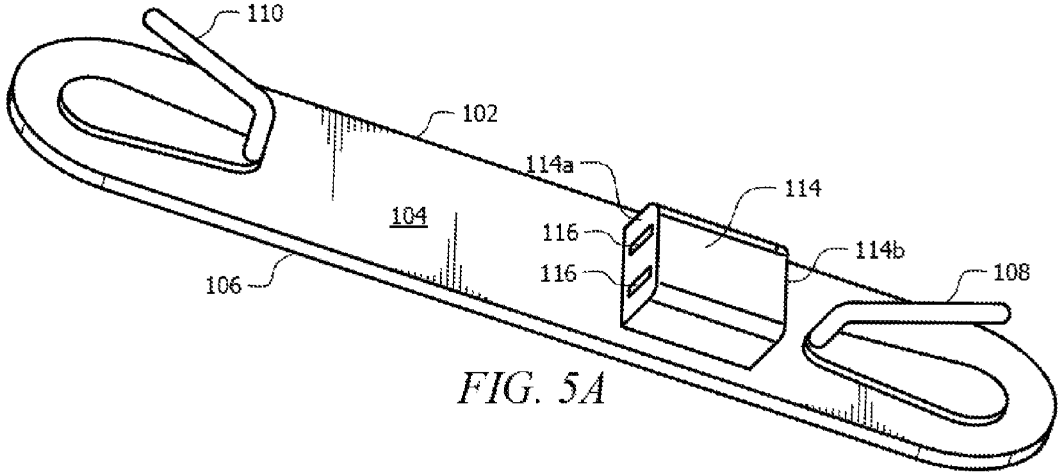
FIG. 5A is a perspective view of the present invention displaying the apertures in the receptacle.
Figure 5B:
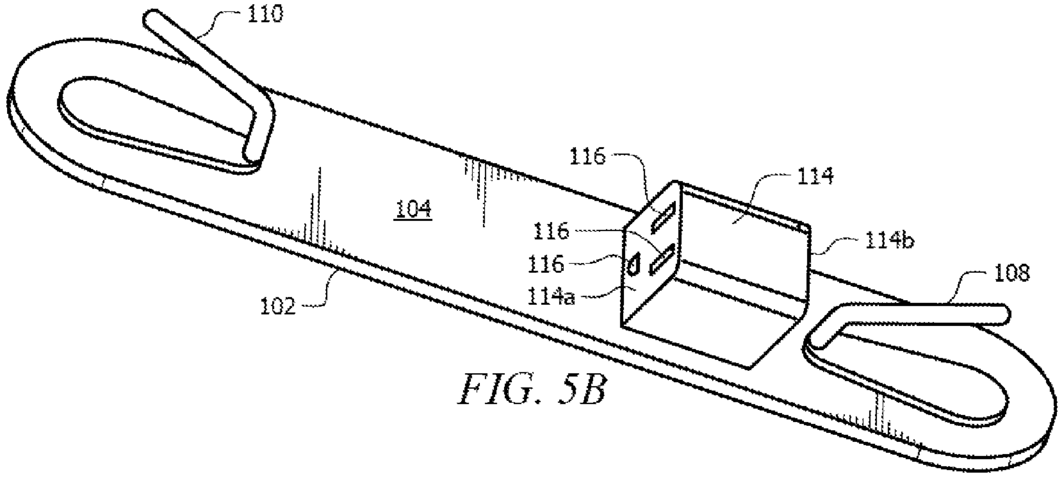
FIG. 5B is a perspective view of the present invention displaying the apertures in the receptacle.

In an embodiment, top surface 104 of substratum 102 also includes receptacle 114. Referring to FIG. 5, receptacle 114 includes apertures 116 configured to receive the prongs extending from the plug end of electrical cord 112. As depicted in FIG. 5A, an embodiment of receptacle 114 includes two slot-shaped apertures 116 to receive a two-prong electrical plug. Alternatively, FIG. 5B provides an embodiment of receptacle 114 having three apertures 116 to receive a three-prong electrical plug. The current figures depict receptacle 114 having various apertures 116 consistent with the most common electrical plugs found in the United States. It is considered, however, that an embodiment of receptacle 114 may have different aperture designs for receiving any configuration of prongs extending from any type of electrical plug.

Receptacle 114 is preferably located between hooks 108, 110, but it is considered that receptacle 114 may be located outside of the two hooks. In addition, surface 114*a* of receptacle 114 having apertures 116 preferably faces one of the hooks 108, 110 to ensure that the cord's plug aligns generally with coiled cord 112, as depicted in FIG. 4.

In an embodiment, receptacle 114 is offset from the midpoint line between hooks 108, 110 such that surface 114*b*, the surface opposite of 114*a*, is closer to the nearest hook than surface 114*a*. This is best illustrated in FIG. 1, wherein surface 114*b* is closer to hook 108 than surface 114*a*. As a result, ample room is provided to accommodate the plug end of cord 112, which is typically a more rigid section of the cord.

In an embodiment, surface 114*b* may be the surface of the receptacle that is oppositely disposed from substratum 102 to account for "low profile" plugs, i.e. prongs that are perpendicular to the longitudinal axis of the plug end of the electrical cord. In addition, surface 114*b* may be any surface except for the object-facing surface, i.e. the surface mated to substratum 102 or simply the surface having the ability to attach to an object.

Figure 6:
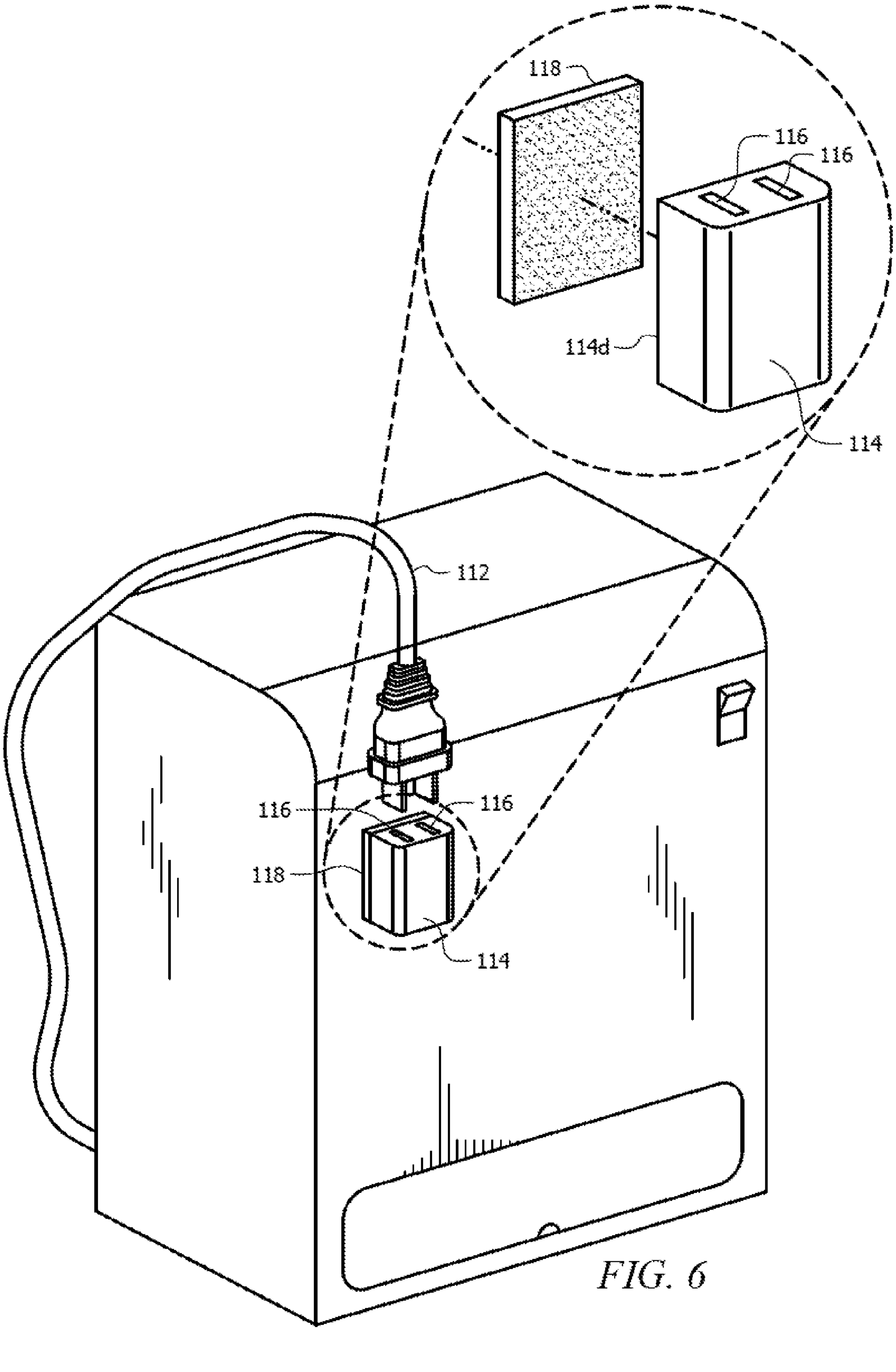
FIG. 6 is a perspective view of an embodiment of the present invention that uses a receptacle without the hooks.

Referring now to FIG. 6, an embodiment of the present invention includes receptacle 114 without hooks 108, 110. Receptacle 114 may rest atop a substratum or simply rely on a bottom surface 114*d* having an adhesive, fastener, one or more magnets, or another securing instrument known to a person of ordinary skill in the art (collectively denoted by reference numeral 118) to ensure that receptacle 114 can be secured to an object. The method of securing receptacle 114 may be temporary or permanent.

Figure 7:
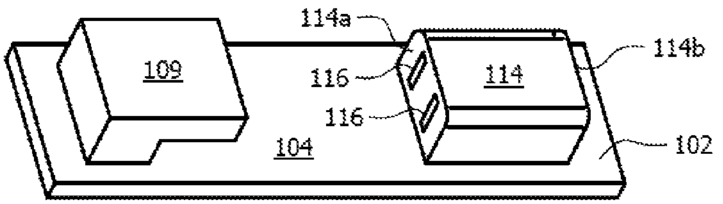
FIG. 7 is a perspective view of an embodiment having a receptacle and a catch.

Referring now to FIG. 7, an embodiment includes receptacle 114 with catch 109. In an embodiment, both receptacle 114 and catch 109 are secured to top surface 104 of a single substratum 102 or each is secured to their own independent substratum 102. Alternatively, receptacle 114 and catch 109 may be used without a substratum and include their own respective securing instrument for attaching to a particular object.

Figure 8:
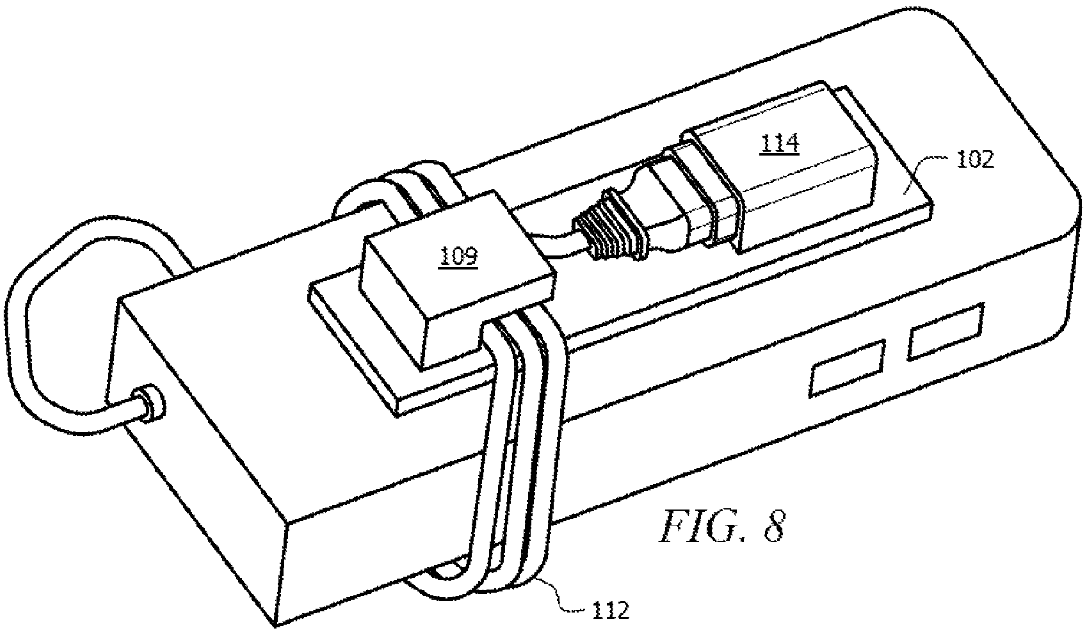
FIG. 8 is a perspective view of an embodiment having a receptacle and a catch.

Referring now to FIG. 8, regardless of whether a receptacle 114 and catch 109 are used with substratum 102, catch 109 preferably faces surface 114*a*. As a result, cord 112 can be wrapped around an object between catch 109 and receptacle 114, and the plug end can mate with receptacle 114 while catch 109 prevents cord 112 from sliding off of the object around which cord 112 is wrapped. Preferably, catch 109 is secured to an object proximate to the point at which cord 112 attaches to the object because electrical cords tend to loosen and slide from the end at which they attach to an object.

Alternatively, receptacle 114 can be secured to the object such that the longitudinal axis (axis extending between surface 114*a* and 114*b*) of receptacle 114 is misaligned with the longitudinal axis of catch 109. For example, receptacle 114 may be perpendicularly oriented with respect to catch 109 such that receptacle 114 shown in FIG. 8 would rotated 90-degrees in a clockwise direction prior to being secured to the object. As a result, the plug end of cord 112 would be parallel with the section of cord secured with catch 109 when the plug end mates with receptacle 114.

Figure 9:
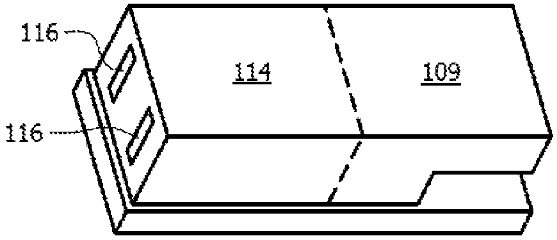
FIG. 9 is a perspective view of an embodiment in which the receptacle and catch are sold as a single separable unit.

Referring now to FIG. 9, an embodiment includes receptacle 114 and catch 109 being manufactured and sold as a single unit to reduce costs. The unit preferably includes a perforated seam to allow the two objects to easily separate and be positioned as desired.

It should be noted that catch 109 and hooks 108, 110 may have the same shape and thus capable of performing the same function.

In an embodiment, receptacle 114 is adapted to receive a portion of cord 112 rather than the prongs extending from the plug end of cord 112. Instead of having prong apertures 116, the alternative receptacle design has a cord receiving area adapted to receive and temporarily secure a cord. The alternative receptacle may have any shape and design known to a person of ordinary skill in the art such that the alternative receptacle is capable of temporarily securing a cord.

In addition, it should be noted that the optimal use of the device includes the following sequential steps for identifying an attachment location: (1) identifying a preliminary attachment location for the device, (2) securing the cord with the device, (3) adjusting the location of the device to ensure that the cord remains taught when secured, and (4) attaching the device at the adjusted location. These steps will ensure that the cord can be consistently secured to the device in an optimal location on the object that was lacking a cord management device.

Glossary of Claim Terms

Cord: is a flexible elongated object, typically containing an electrical conduit.

Hook: is an angular or curved object for holding or suspending something.

Outwardly Facing: is an orientation in which the curved or obtusely angled portion of the hooks face away from each other.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A cord management device, comprising:

a flexible substratum having a top surface and a bottom surface, the substratum adapted to flex generally 90 degrees between a first end and a second end;

a pair of outwardly facing hooks disposed on the top surface; and a receptacle secured between the pair of outwardly facing hooks, the receptacle having two or more apertures adapted to receive prongs extending from a plug end of an electrical cord.

2. The cord management device of claim 1, further including an adhesive on the bottom surface of the substratum, thereby allowing the device to be secured to an object in need of a cord management device.

3. The cord management device of claim 1, further including a plurality of magnets on the bottom surface of the substratum, thereby allowing the device to be secured to an object in need of a cord management device.

4. The cord management device of claim 1, further including the receptacle having a first surface containing the two or more apertures and a second surface opposite of the first, wherein the second surface is closer to a nearest hook than the first surface.

5. A cord management device, comprising:

a flexible substratum having a top surface and a bottom surface, the substratum adapted to bend 90 degrees between a first end and a second end;

a pair of outwardly facing hooks disposed on the top surface; and whereby the device can be secured to an object having an attached cord and the attached cord can be wrapped around the pair of outwardly facing hooks to secure the attached cord.

6. The cord management device of claim 5, wherein the substratum is flexible, thereby enabling the device to be secured to non-flat surfaces.

7. The cord management device of claim 5, further including an adhesive on the bottom surface of the substratum, thereby allowing the device to be secured to an object in need of a cord management device.

8. The cord management device of claim 5, further including a plurality of magnets on the bottom surface of the substratum, thereby allowing the device to be secured to an object in need of a cord management device.

9. The cord management device of claim 5, further including a receptacle having a first surface containing the two or more apertures and a second surface free of apertures, wherein the second surface is closer to one of the hooks than the first surface.

10. The cord management device of claim 5, further including a receptacle configured to receive and temporarily secure a portion of the attached cord.

* * * * *